Figure 1:
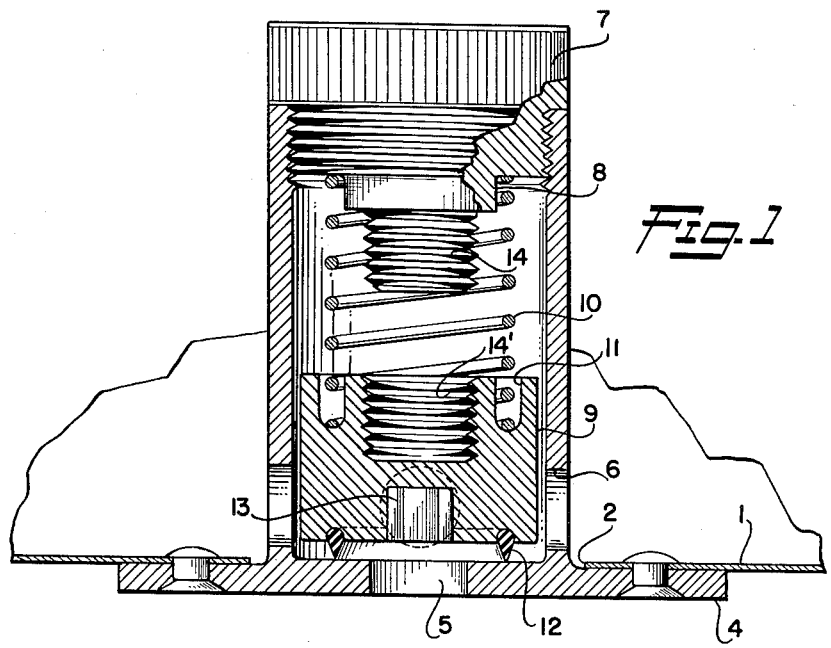

March 27, 1962  E. R. DERRINGTON ETAL  3,026,897
DRAIN VALVE
Filed Nov. 2, 1959

INVENTORS
EDWARD R. DERRINGTON
ROBERT F. RAY
By George C. Sullivan
Agent

3,026,897
DRAIN VALVE
Edward R. Derrington, La Canada, and Robert F. Ray, Pacoima, Calif., assignors to Lockheed Aircraft Corporation, Burbank, Calif.
Filed Nov. 2, 1959, Ser. No. 860,054
3 Claims. (Cl. 137—315)

This invention relates to a tank or sump drain valve and more particularly to an internally mounted valve to provide fast momentary or continuous draining of a tank, sump or other vessel.

A common problem of most all valves lies in the deterioration of the valve seat and the need for frequent replacement. In most instances this wear and deterioration is brought about by solid particles in the fluids such as dirt or other foreign matter passing through the valves and impinging on the valve seat causing undue wear. Replacement of the valve seats or seals generally requires that the fluid supply or flow be stopped at another valve elsewhere and the complete valve be dismounted for replacement of the seals or seats. This operation generally requires the skill of a craftsman and consumes a considerable amount of time. At the time time it inherently requires a second valve or other means to shut off flow. Furthermore, the valve structure projecting from the vessel or tank is subjected to numerous blows and impacts which cause failure of parts or misalignment resulting in faulty operation. The present invention seeks to eliminate many of the disadvantages of the prior art valve structures while retaining their main advantages.

A first object of this invention is to provide an internally flush mounted valve to provide fast momentary or continuous draining.

A second object of the invention is to provide a valve in which the seal is so located that fluid being drained washes the seal seat.

A further object of the invention is to provide a valve seal which may be replaced without draining the vessel or tank.

A further object of the invention is to provide a valve having no parts projecting externally from the vessel or tank which is to be drained.

A further object of the invention is to provide a valve which may be locked in open position to provide continuous draining.

These and further objects as may be apparent to one skilled in the art are provided by the present invention which comprises a cylindrical body portion having a closed end wall with an annular projecting flange or lip as a continuation of said end wall and means for mounting the annular lip on the edge of a circular hole in a vessel or tank. The body portion has a series of ports in the vicinity of said lip and on the circular or cylindrical portion of said body. A central aperture is located in said end wall. Piston means are located within said cylindrical body and provided with a resilient spring urging said piston against the end wall, and having seal means between the end of said piston and said end wall. An end cap closes the other end of the cylindrical body and has a reduced portion for retaining said resilient spring. Means for locking said piston in an open position are provided on said end cap. A removable section in the end wall concentric with said aperture has an additional seal thereon which facilitates seal replacement.

Figure 2:
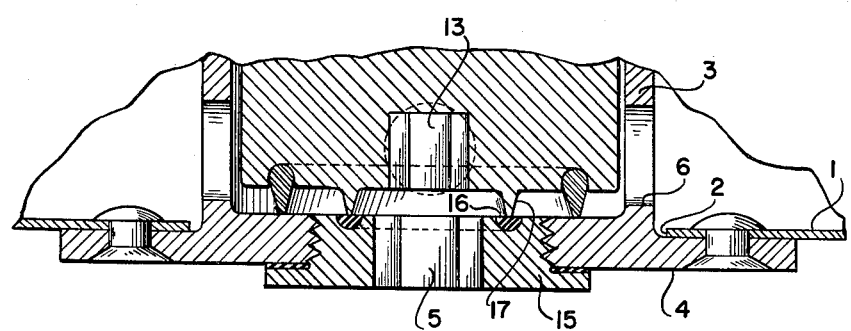

Referring to the drawings:
FIGURE 1 is a sectional view of the invention as mounted in the wall of the vessel.
FIGURE 2 illustrates a modified form of the invention which utilizes a double seal arrangement.
In FIGURE 1 the reference character 1 indicates the wall of a tank or other vessel which requires periodic draining. The tank is provided with an access hole 2 in the wall thereof. A cylindrical body portion 3 having a flange or lip portion 4 is mounted in the access hole 2 by suitable means, such as riveting, welding, or otherwise, providing a fluid-tight joint. A central aperture 5 is located in the end wall of body 3. End cap 7 closes the other end of the cylindrical body. A reduced portion 8 defining an annular shoulder is provided on the inner end of the end cap.

Piston 9 is fitted into the lower portion of the cylindrical body 3 and is urged against the end wall by means of a spring 10 which is seated at one end around the reduced portion 8 and against the annular shoulder of the end cap 7 and at the other end into an annular recess 11 in the piston 9. A seal 12 is fitted in an annular groove on the base of piston 9 and bears against the end wall when the piston is in the lower position as shown in FIGURE 1. A socket 13 is provided in the piston 9 opposite the aperture 5 for lifting the piston for momentary draining or turning to lock in open position for continuous draining. Matching threads 14 and 14' are provided on the reduced portion 8 and in the upper end of piston 9 to provide for retaining the piston in open position.

In the embodiment shown in FIGURE 2, a central plug 15 is provided. A circular seal 16 is fitted into an annular groove of the plug 15 and in conjunction with the projecting annular ring 17 provides a fluid seal which may be replaced at periodic intervals without the necessity of draining the subject tank or vessel. In the configuration of FIGURE 2, seal 16 is considered as the primary seal while seal 12 is a secondary seal, the latter preventing draining when the primary seal is being replaced. As shown, a flange overlaps the adjacent wall area for compressing a seal of O ring type, or the like. The plug is effectively locked by means of the spring pressure and friction.

The subject valve is operated by inserting a suitable tool through the aperture 5 into socket 13 and compressing the spring 10 thereby lifting the piston seal 12 from the end wall of the cylindrical body, permitting the fluid within the tank to flow through the port 6 and out through the aperture 5. To provide continuous draining, the piston is further depressed and threaded onto the reduced portion 8, as illustrated. In the modification shown in FIGURE 2, the central plug 15 may be removed for replacing of the seal 16 thereby eliminating the necessity of draining the tank.

From the above description, it will be apparent that this invention provides a means for quick easy draining of vessels, tanks, or the like, and particularly for such contaminants as dirt, water, etc., where there is a need for a flush mounted valve and all fluid must be drained from a particular area. It is also apparent that the valve is so constructed that fluid being drained continually washes the seal seat thereby insuring that the sealing surface will be clean, and preventing leakage due to a contaminant on the sealing surface when the valve is closed. Furthermore, the invention permits ready replacement of the primary seal without draining.

It will, of course, be understood, that various details of construction may be varied through a wide range without departing from the principles of this invention. For example, the sockets 13 and 5 may be of any desired configuration such as to accommodate the familiar Allen-type wrenches, or the like, and the threaded portions 14, 14' may be replaced by a bayonet-type construction, if so desired. Accordingly, the above description is to be considered as illustrative only and in no way as limiting the invention except as defined by the scope of the appended claims.

What is claimed is:

1. A drain valve comprising a base plate having a removable central portion, said removable portion having an aperture and an annular sealing means embedded therein and surrounding said aperture, an aperture closure member having an integral annular ring for engaging said sealing means and providing a primary seal, an annular sealing means embedded in said closure member, surrounding and spaced from said removable portion and providing a secondary seal, means for urging said closure member against said plate, whereby said sealing means are compressed, providing a fluid sealing arrangement, and said primary seal may be replaced while said secondary seal is closed, and means for unseating both seals simultaneously.

2. The valve combination of claim 1, in which means are provided for retaining said seals in an unseated position.

3. A drain valve for flush mounting in a vessel wall, comprising a cylindrical body having an aperture centrally located in one end thereof, means for attaching said body to said vessel, ports in said body adjacent said one end, a piston slidably positioned within said body, said piston having an annular groove in one end and an annular recess in the other end, a seal embedded in said groove, an end cap closing the other end of said cylindrical body, spring means seated in said recess and against said end cap for urging said seal against said one end, thereby compressing said seal and closing the passage of fluid from said ports to said aperture, means on said end cap and said piston for retaining said piston away from said one end, a removable section including said aperture in said one end, an annular seal embedded in said section, means on said one end of said piston for engaging the annular seal on said section and means for unseating both such simultaneously.

References Cited in the file of this patent
UNITED STATES PATENTS

| | | |
|---|---|---|
| 433,072 | Dauchy | July 29, 1890 |
| 2,655,932 | Lipman | Oct. 20, 1953 |

FOREIGN PATENTS

| | | |
|---|---|---|
| 668,939 | France | July 23, 1929 |